(12) United States Patent
Luterstein

(10) Patent No.: US 6,511,098 B1
(45) Date of Patent: Jan. 28, 2003

(54) SEAL MECHANISM FOR BAYONET-TYPE CONNECTOR

(75) Inventor: Alex Luterstein, Granada Hills, CA (US)

(73) Assignee: Whittaker Corporation

( * ) Notice: Subject to any disclaimer, the term of this patent is extended or adjusted under 35 U.S.C. 154(b) by 74 days.

(21) Appl. No.: 09/846,097

(22) Filed: Apr. 30, 2001

Related U.S. Application Data

(60) Provisional application No. 60/204,005, filed on May 15, 2000.

(51) Int. Cl.[7] ................................................ F16L 39/00
(52) U.S. Cl. ............................ 285/81; 285/87; 285/361; 285/362; 285/377
(58) Field of Search ........................ 285/81, 89, 360, 285/361, 362, 376, 377, 396, 401, 402

(56) References Cited

U.S. PATENT DOCUMENTS

| | | | |
|---|---|---|---|
| 260,966 A | * 7/1882 | Frey | 285/238 |
| 509,742 A | * 11/1893 | Lane | 285/353 |
| 826,018 A | * 7/1906 | Concoff | 285/353 |
| 1,778,739 A | * 10/1930 | Wheaton | 285/362 |
| 2,529,821 A | * 11/1950 | Snider | 285/148.19 |
| 2,818,279 A | 12/1957 | Knapp | |
| 3,390,900 A | * 7/1968 | McCormick | 285/354 |
| 4,280,719 A | * 7/1981 | Daniel et al. | 285/377 |
| 4,429,938 A | 2/1984 | Flor | |
| 4,613,162 A | * 9/1986 | Hughes | 166/242.6 |
| 5,101,906 A | * 4/1992 | Carlin et al. | 166/380 |
| 5,115,550 A | * 5/1992 | Williamson | 285/212 |
| 5,411,350 A | 5/1995 | Breault | |
| 5,464,300 A | 11/1995 | Crainich | |
| 5,634,737 A | 6/1997 | Voss et al. | |
| 6,250,688 B1 | * 6/2001 | Kirby | 285/148.21 |

* cited by examiner

*Primary Examiner*—Eric K. Nicholson
(74) *Attorney, Agent, or Firm*—Henry M. Bissell; Henry M. Bissell, IV

(57) ABSTRACT

A seal mechanism for conveniently coupling bayonet-type connectors while providing stable compression of the seal therebetween. The mechanism enables a more rigid configuration providing increased resistance to deformation from lateral forces. The mechanism incorporates an internally threaded coupling nut support element which cooperates with a threaded flange projecting from the plug sleeve to maintain a hermetic seal under conditions applying lateral forces to the connection. Interaction between the support element and the threaded flange permit the support element to be installed onto or removed from the connector assembly.

24 Claims, 2 Drawing Sheets

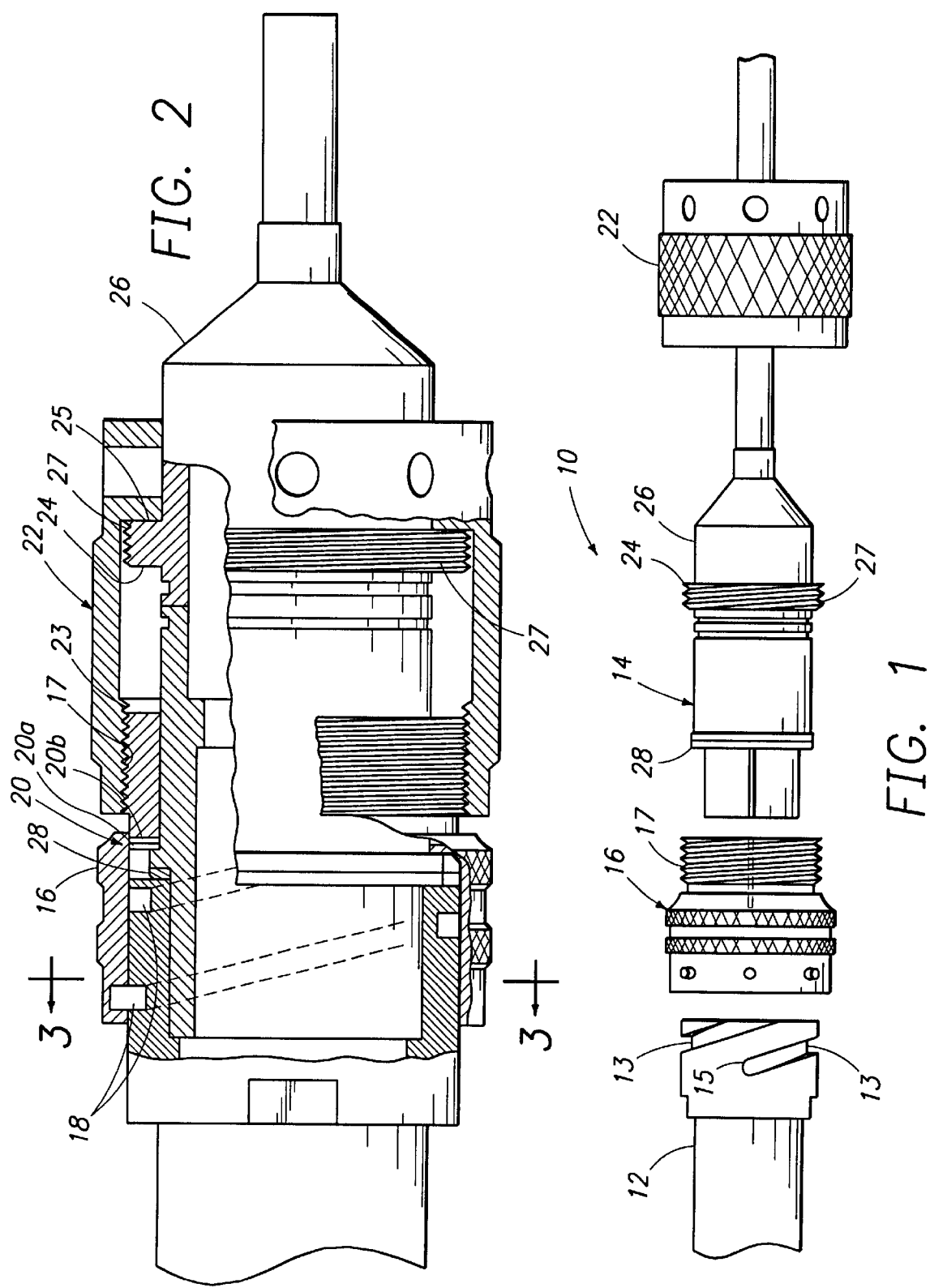

SEAL MECHANISM FOR BAYONET-TYPE CONNECTOR

CROSS-REFERENCE TO RELATED APPLICATION

This application claims the benefit of U.S. Provisional Application No.: 60/204,005, filed May 15, 2000.

BACKGROUND OF THE INVENTION

1. Field of the Invention

The present invention relates generally to quick connect couplings and, more particularly, to a bayonet-type connector providing for stable compression of a hermetic seal therein.

2. Description of the Related Art

U.S. Pat. No. 2,818,279 of Knapp discloses a lugged pipe coupling with positive lock means. The device of Knapp is a bayonet-type coupler having a compression spring biasing apart two slidable portions, and a manually operable locking collar. Knapp does not disclose added rigidity against lateral forces applied to the coupling arrangement. In addition, Knapp does not disclose the dual threaded portion of the present invention by way of the threaded collar of a coupling ring and the projecting threaded flange for retaining the coupling nut support element as are provided in embodiments of the present invention.

SUMMARY OF THE INVENTION

In brief, particular arrangements of the present invention comprise a bayonet-type connector having a seal locking arrangement which provides a stable and secure seal that resists deformation under lateral forces. An internally threaded coupling nut support element is employed in the connector assembly to be threaded onto a coupling ring in order to secure the two parts of the connector together and maintain the gasket seal under stable compression. This more rigid configuration resists deformation by lateral forces which might otherwise breach the conventional gasket seal.

One part of the connector is a coupling ring having three internal, inwardly directed pins equally spaced about the central bore. In conventional bayonet coupler fashion, these pins slide into three spiral cam surfaces in the other connector part as the two parts are rotated relative to each other, thereby drawing the connector parts together. The pins become seated in recesses at the ends of the cam slots to provide engagement of the bayonet coupler until forcibly released.

The part of the connector with which the coupling ring is associated has an outwardly projecting shoulder extending about the shell portion at its rearward end. The coupling nut support element has a radially inwardly directed shoulder portion which bears against the shoulder portion of the shell and, when the coupling nut support element is threaded onto the coupling ring, the two interfering shoulders develop an axially directed force which increases the compression of the seal gasket beyond the extent which is developed by the standard bayonet coupling arrangement. Tightening of the support element on the coupling ring also makes the overall assembly more rigid, thereby serving to protect the bayonet coupler against lateral deformation.

The rearward portion of the coupling ring and the outwardly projecting shoulder portion of the shell are both threaded to match the internal thread of the coupling nut support element. As a result, when the coupling nut support element is unthreaded from the coupling ring, as when the bayonet coupler is disconnected, it can be removed from the associated connector portion by unthreading it to move past the outwardly projecting shoulder of the shell portion. Conversely, the forward part of the coupling nut support element is able to move into operative position by threading the part past the projecting shoulder in the opposite direction during assembly.

BRIEF DESCRIPTION OF THE DRAWINGS

A better understanding of the present invention may be realized from a consideration of the following detailed description, taken in conjunction with the accompanying drawings, in which:

FIG. 1 is an exploded view of the bayonet-type connector of the present invention;

FIG. 2 is a side view, partially broken away, of the arrangement of FIG. 1 in assembled form;

DESCRIPTION OF THE PREFERRED EMBODIMENTS

Figure 3:
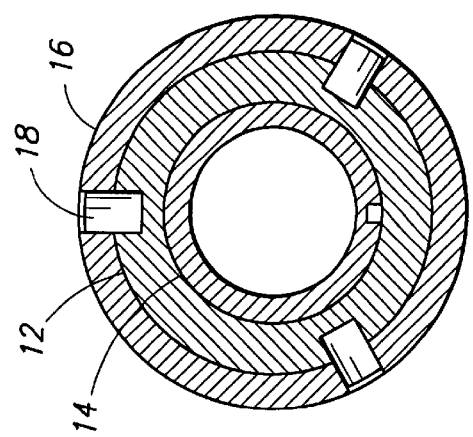
FIG. 3 is a cross-sectional view taken at the plane 3—3 of FIG. 2 and looking in the direction of the arrows.

Referring now to the drawings and in particular FIG. 1, there is shown seal mechanism 10 having a generally cylindrical connector shell 12 and a generally cylindrical plug shell 14. Generally cylindrical coupling ring 16 telescopes over plug shell 14 and is threaded with external threads 17 at its rearward end, remote from connector shell 12. Connector shell 12 has three helical grooves 13 for receiving corresponding locking pins 18 which are directed radially inward from coupling ring 16, as shown in the sectional view of FIG. 3.

At the terminal end of each helical groove 13 of the connector shell 12 is a recessed portion 15, creating a slightly cam-shaped surface which permits the coupling ring 16 to withdraw slightly from connector shell 12 in response to the compression force of seal 20 (FIG. 2). Seal 20 comprises a flat washer 20a and a spring, or wave, washer 20b. This construction permits the two parts of washer 20 to rotate relative to each other as the bayonet-type coupling engages or disengages.

As shown in FIG. 2, coupling nut support element 22 has internal threads for threading onto the externally threaded collar 17 of coupling ring 16. Coupling nut support element 22 has an inwardly extending shoulder portion 25 remote from its threaded end which bears against an outwardly projecting flange or shoulder 24 on the sleeve 26. The flange 24 is threaded with threads 27 which correspond to the threads 17, both of which match the threads 23. As coupling nut support element 22 is threaded and tightened onto coupling ring 16, the interference between outwardly projecting flange 24 of sleeve 26 and the inwardly extending shoulder 25 portion of coupling nut support element 22 draws the two parts 12 and 14 of the connector 10 more tightly together, compressing the gasket seal 28 further and thereby maintaining gasket 28 under stable compression. This arrangement also makes the overall connector more rigid and better able to resist deformation by lateral forces.

Figure 4:
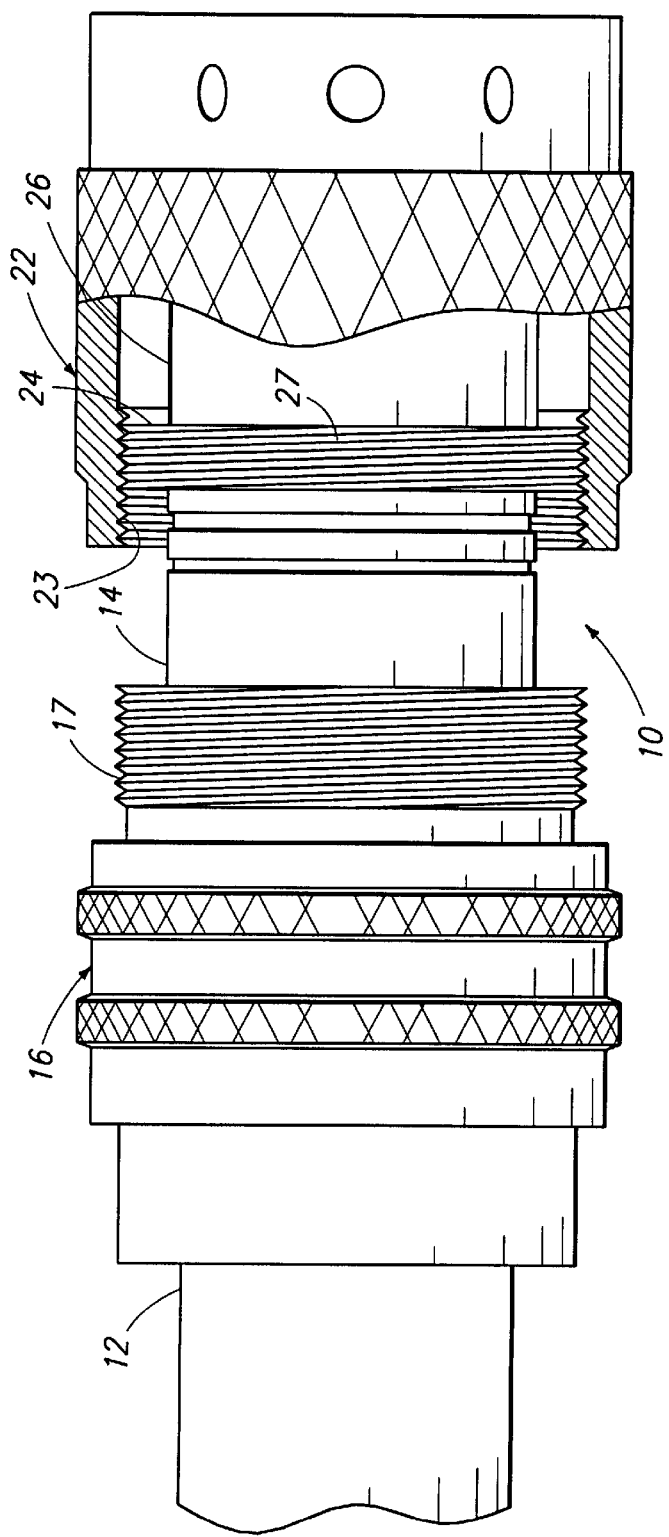
FIG. 4 is a side view, partially broken away, like that of FIG. 2 but showing the arrangement in partially disassembled form.

FIG. 4 illustrates the way in which the internal threads 23 of the coupling support member 22 mate with the external threads 27 of the plug shell 14, thus permitting the coupling support member 22 to be threaded onto the shell 14 for engagement with the threads 17 during assembly. Conversely, the coupling support member 22 may be unthreaded for disengagement and removal from the plug shell 14 during disassembly.

Although there have been described hereinabove various specific arrangements of a SEAL MECHANISM FOR BAYONET-TYPE CONNECTOR in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for coupling together a pair of mating connectors in a bayonet-type arrangement comprising:

a first mating connector shell and a second mating connector shell, the two shells having matching configurations to permit joining together of the associated mating connectors to provide an uninterrupted, hermetically sealed path through said connectors when joined;

the first mating connector shell having a plurality of spiral grooves spaced about its periphery for receiving a corresponding plurality of retaining members in a releasable bayonet-type coupling;

a coupling ring having a plurality of retaining members corresponding in number and spacing to said plurality of spiral grooves for engaging said spiral grooves of said first matching connector shell to establish said releasable bayonet coupling during rotation of the coupling ring relative thereto;

said coupling ring and said second mating connector shell having a cooperative structural configuration which permits the ring to rotate while limiting axial movement of the ring relative to the shell such that as the coupling ring is rotated in a direction to propel said retaining members along said spiral grooves toward a locking position, the ring draws the two mating connectors and associated connector shells together to establish said coupling;

a circular gasket mounted on one connector shell in a position to bear against a sealing surface on the other connector shell to establish a compression seal for the joint between the pair of mating connectors, the extent of compression of the gasket being determined by the retention of said retaining members in said bayonet-type coupling; and a coupling nut support element encircling and engaging portions of said coupling ring and said second mating connector shell for increasing the compression of said gasket against said sealing surface and rigidizing said coupling by drawing said second connector shell toward said first connector shell in a rigid juxtaposition.

2. The apparatus of claim 1 wherein said plurality of retaining members comprises a plurality of radially inwardly directed pins mounted about the bore of the coupling ring.

3. The apparatus of claim 1 wherein the cooperative structural configuration between the coupling ring and the second mating connector shell comprises an outwardly projecting flange extending about the forward end of the second mating connector shell and a reduced diameter collar having an annular surface for contacting said flange.

4. The apparatus of claim 1 further comprising a wave washer backing the gasket to provide resilience between the first and second mating connector shells when the connectors are joined in the bayonet-type coupling.

5. The apparatus of claim 1 wherein each of the spiral grooves in the first mating connector shell terminates in a recessed portion, offset to the side of the groove, to retain the corresponding retaining member of the coupling ring when the connectors are coupled together.

6. The apparatus of claim 5 further including a resilient wave washer backing up the gasket to provide sufficient resilience in the coupling for the retaining members of the coupling ring to slide into and out of the recessed portions of the corresponding spiral grooves during coupling and uncoupling of the bayonet-type arrangement.

7. The apparatus of claim 1 wherein the second mating connector shell includes an outwardly projecting flange extending about the shell in a position remote from its forward end, and the coupling nut support element includes an inwardly extending shoulder portion positioned to bear against the outwardly projecting flange of the second mating connector shell when the coupling nut support element is tightened into final position.

8. The apparatus of claim 7 wherein the rearward portion of the coupling ring comprises an externally threaded collar and the forward portion of the coupling nut support element has internal threads matching the external threads of the coupling ring collar, said threaded portions, when tightly threaded together, serving to propel the second mating connector shell toward the first mating connector shell to increase the compression of the gasket and to rigidize the overall bayonet-type coupling.

9. The apparatus of claim 8 wherein the outwardly projecting flange of the second mating connector shell has an external thread which matches the internal thread of the forward portion of the coupling nut support element in order that the coupling nut support element may be installed and removed from the second mating connector shell.

10. The apparatus of claim 7 wherein the coupling nut support element and the second mating connector shell are configured to removably retain the coupling nut support element on the second mating connector shell while providing freedom to the two parts to rotate and move axially relative to one another.

11. The apparatus of claim 10 whereby the coupling nut support element is removable from retention by the second mating connector shell by rotating the coupling nut support element in a direction to unthread it past the threaded flange of the second mating connector shell.

12. In a combination of bayonet-type coupling apparatus comprising first and second connectors having corresponding connector shells associated therewith, the first connector shell having a plurality of spiral grooves for receiving inwardly projecting pins of a coupling ring rotatably mounted on said second connector shell for drawing the two connectors into a coupling with each other by rotating the coupling ring to move said pins along said grooves, and a circular gasket mounted on one connector shell in a position to bear against a sealing surface on the other connector shell to establish a compression seal for the joint between the pair of mating connectors, the compressive force on the gasket being determined by the retention of said coupling ring pins in said bayonet-type coupling, the improvement comprising:

a coupling nut support element surrounding and engaging portions of said coupling ring and said second connector shell for increasing the compressive force on said gasket and rigidizing said bayonet-type coupling by drawing said second connector shell toward said first connector shell in a rigid juxtaposition.

13. The apparatus of claim 12 wherein the second connector shell includes an outwardly projecting flange extending about the shell in a position remote from its forward end, and the coupling nut support element includes an inwardly extending shoulder portion positioned to bear against the outwardly projecting flange of the second connector shell when the coupling nut support element is tightened into final position.

14. The apparatus of claim 13 wherein the rearward portion of the coupling ring comprises an externally threaded collar and the forward portion of the coupling nut support element has internal threads matching the external threads of the coupling ring collar, said threaded portions, when tightly threaded together, serving to propel the second connector shell toward the first connector shell to increase the compressive force on the gasket and to rigidize the overall bayonet-type coupling.

15. The apparatus of claim 14 wherein the outwardly projecting flange of the second connector shell has an external thread which matches the internal thread of the forward portion of the coupling nut support element in order that the coupling nut support element may be installed and removed from the second connector shell.

16. The apparatus of claim 15 wherein the coupling nut support element and the second connector shell are configured to removably retain the coupling nut support element on the second connector shell while providing freedom to the two parts to rotate and move axially relative to one another.

17. The apparatus of claim 15 whereby the coupling nut support element is removable from retention by the second connector shell by rotating the coupling nut support element in a direction to unthread it past the threaded flange of the second connector shell.

18. A seal mechanism for bayonet-type connectors, said seal mechanism comprising:

a connector shell;

a plug shell for coupling to said connector shell and having a radially projecting threaded flange at an end remote from the connector shell;

a coupling ring releasably securing said connector shell and said plug shell;

a seal portion disposed between said connector shell and said coupling ring including a gasket mounted on said plug shell and adapted to seal the joint between said connector shell and said plug shell; and a coupling nut support element having an inwardly projecting shoulder portion and a threaded interior surface portion for hermetically connecting said plug shell to said connector shell for rigidly supporting said seal portion and providing added compressive force to said gasket.

19. A seal mechanism according to claim 18, wherein said connector shell defines a plurality of helical grooves terminating in recessed portions, and said coupling ring has a plurality of inwardly projecting locking pins equal in number to the helical grooves of said connector shell for engagement therewith.

20. A seal mechanism according to claim 19, wherein said coupling ring has an externally threaded collar portion remote from the locking pins for engaging said coupling nut support element.

21. The seal mechanism of claim 18, wherein said connector shell is adapted to receive said coupling ring in a bayonet-type coupling.

22. The seal mechanism of claim 18, wherein said seal portion comprises a flat washer and a wave washer encircling said plug shell inside said coupling ring and adjacent the interior of said externally threaded collar.

23. The seal mechanism of claim 18, wherein said inwardly extending shoulder portion of the coupling nut support element is adapted to bear against said radially projecting flange to propel said plug shell into tighter compression of said gasket.

24. The seal mechanism of claim 18, wherein said threaded flange has external threads corresponding to the internal threads of said coupling nut support element, whereby said coupling nut support element may be threadably advanced beyond, and subsequently retained by, said flange.

\* \* \* \* \*